United States Patent [19]

Adams et al.

[11] Patent Number: 5,065,059

[45] Date of Patent: Nov. 12, 1991

[54] FIELD COIL POLE TO POLE CONNECTOR WITH HIGH CYCLIC DUTY CAPABILITY

[75] Inventors: Steven L. Adams, Clifton Park; William L. Bird, Scotia; Humphrey W. Chow, Schenectady; Kirk G. O'Brien, Broadalbin; Paul C. Rasmussen, Schaghticoke, all of N.Y.

[73] Assignee: General Electric Company, Schenectady, N.Y.

[21] Appl. No.: 453,304

[22] Filed: Dec. 20, 1989

[51] Int. Cl.$^5$ ............................................. H02K 11/00
[52] U.S. Cl. ...................................... 310/71; 310/184; 310/198; 310/206; 310/208; 310/261
[58] Field of Search ................. 310/71, 200, 201, 206, 310/213, 165, 179, 180, 184, 195, 208, 198, 261, 216; 174/13, 99 E; 336/107, 192

[56] References Cited

U.S. PATENT DOCUMENTS

| | | |
|---|---|---|
| 1,588,556 | 6/1926 | Thompson . |
| 1,967,340 | 7/1934 | Van Splunter ................... 173/324 |
| 2,742,617 | 4/1956 | Bondley ............................ 333/83 |
| 3,422,213 | 1/1969 | Webb ................................ 174/72 |
| 3,979,615 | 9/1976 | Neff .................................. 310/71 |
| 4,037,916 | 7/1977 | Thompson Jr. ............... 339/258 R |
| 4,442,182 | 4/1984 | Chart ............................... 428/654 |
| 4,481,438 | 11/1984 | Keim ................................ 310/201 |
| 4,544,856 | 10/1985 | King ................................. 310/71 |
| 4,642,497 | 2/1987 | Boyd, Jr. ......................... 310/68 R |
| 4,642,885 | 2/1987 | King ................................. 29/596 |
| 4,649,304 | 3/1987 | Atherton et al. ................. 310/71 |
| 4,870,308 | 9/1989 | Sismour, Jr. .................... 310/71 |

FOREIGN PATENT DOCUMENTS

| | | | |
|---|---|---|---|
| 0125401 | 9/1979 | Japan ................................ 310/201 |
| 0457234 | 11/1936 | United Kingdom ............. 310/201 |

*Primary Examiner*—R. Skudy
*Attorney, Agent, or Firm*—Nixon & Vanderhye

[57] ABSTRACT

A high start/stop cyclic capability connector to interconnect the field coil poles in a rotating electric machine. The connector includes a U-shaped intermediate portion with parallel jaws which include extensions perpendicular to the faces of the jaws a distance significantly greater than the width of the jaws, and with connecting pads configured for matching connection to the field coils and orienting the connector such that start/stop inertial forces are applied in the radial direction which causes circumferential flexure of the connector, and flexure due to thermal cycling is in the circumferential direction.

43 Claims, 4 Drawing Sheets

FIELD COIL POLE TO POLE CONNECTOR WITH HIGH CYCLIC DUTY CAPABILITY

BACKGROUND OF INVENTION

This invention was made with United States Government support under a contract with the United States Navy. The government has certain rights in this invention.

The present invention relates generally to high current electrical connectors, and more specifically to such connectors suitable for use in connecting the poles of adjacent field coils positioned on a generator or motor rotor.

Large electrical motors and generators are used in industrial plants and processes, for generation of electrical power, and also for marine or shipboard use. In marine applications they are frequently utilized in the generation of electrical power; and in ships' propulsion systems, that is, in providing the power for driving the ships' propellers. In these and other applications, such large motors and generators are frequently subjected to repeated starts and stops. Failures of such large generators or motors are considered serious matters, and reliability of operation is a prime requirement for such machines. Failures will seriously affect operations of industrial plants and power systems, and in the case of marine applications, the ability of the ship to supply necessary power and even the ability to maneuver and maintain headway. As an example of the extreme reliability required for marine applications, customer specifications may require that marine installations meet a cyclic duty requirement of well in excess of fifty thousand starts and stops. Moreover, in order to provide assurance of meeting such stringent requirements, generators and motors have to be designed for reliable start/stop cyclic duty requirements which are well in excess of the required number. These requirements are up to 10 times the design life of existing field connectors.

The problem of repeated start/stop cycling of large generators and motors having substantial size and weight results from significant inertial and thermal forces and strains on the various components of such generators and motors. Components at a distance from the axis of the generator or motor are, for example, subjected to significant centrifugal forces in which the restrained components react against the restraint with a force directed away from the center of curvature of its path. This centrifugal force is directly related to the product of the mass of the body and its centripetal acceleration. Such forces are of particular concern in large generators and motors where components are located significant distances from the axis of rotation. Such components include field coils disposed about the rotor and restrained from moving outward away from the generator or motor axis and core by restraining means such as adhesives, coil wedges, and retaining rings and other restraining mechanisms.

Electrical connectors which connect the field coils to terminals for connection, for example, to the field coil exciter are subjected to various forces, including centrifugal force and forces tending to move the field coils relative to the rotor and to each other each time the generator or motor is started or stopped. Concern has arisen that such connectors are potential weak links in such generators and motors.

One connector designed to withstand repeated start/stop cycles utilizes a leaved structure composed of many thin copper leaves joined together to provide a single piece connector. To provide for limited movement and resist repeated stresses due to the start/stop cycles, its general configuration includes a curved or a U-shaped bend. The upper jaw of such a connector is parallel to and connected to the field coil. In such arrangements, the multiple leaves and curve extend from the field coils parallel to the axis of rotation of the generator, and the thickness of the connector parallel to the axis of rotation is much greater than the width of the jaws perpendicular to the axis of rotation. With such an arrangement the deformations and principal inertial forces generated by start/stop cycles between the field coil and the terminal are applied perpendicular to the thin curved surface, or surfaces, to tend to flex or deform the curve to absorb any movement or forces. In the case of a U-shaped member, such forces tend to move the flexible jaws relative to each other in order to absorb centrifugal forces applied across the jaws.

Such arrangements have proven effective and reliable in operation for many applications and represent conventional wisdom for such connectors. However, we have concluded, among other things, that such connectors are too flexible and will not support very high numbers of start/stop cycles of loading, even though adequate flexibility is required of such connectors. The need for the increased reliability described above, and in particular the ability to withstand significantly increased cycles of start-stop operation, and the need to withstand fatigue failures over such increased cycles, has led to the need for a more reliable connector which will withstand increased start/stop cycles.

OBJECTS AND SUMMARY OF INVENTION

An object of the present invention is to provide an improved connector for field coils in an electric generator or motor with a high start/stop cyclic duty capability.

Another object of the present invention is to provide an improved field coil pole to pole connector which will withstand repeated starts and stops of a motor or generator and which exhibits increased insensitivity to fatigue.

Still another object of the present invention is to provide flexibility in field coil connectors which is adequate in order to withstand high start/stop cycles.

Yet another object of the present invention is to provide an improved connector to interconnect adjacent poles of the field coils of a generator or motor with connecting portions, configured for positive and controlled interconnections.

In accordance with one embodiment of the present invention, an integral field pole to pole connector is provided in a rotating electric machine comprising a generally U-shaped central region interconnecting connecting pads which are electrically connected to adjacent poles of the field winding of the generator. The sides of the generally U-shaped central region extends a significant distance in a direction radial to the axis of the generator as compared with the distance across the jaws of the U-shaped member, which jaws extend in an axial direction substantially parallel to the axis of the generator. Inertial forces resulting from the start/stop rotation of the generator rotor are applied in the radial direction which causes circumferential flexure of the connector, as does the flexure due to field coil thermal expansion or contraction during start/stop cycles. The connector is fabricated of high-conductivity copper, and the connecting pads may be brazed to the poles of adjacent coils. The connecting pads and coils are configured to provide positive and contoured interconnections with the field coils.

BRIEF DESCRIPTION OF DRAWINGS

Referring first to FIG. 1. FIG. 1 shows a simplified arrangement in somewhat schematic form of a generator or motor 10 having a rotor 12 wherein rotor field coil windings such as 18, 20, and 22, 24 which form field coils 50 and 52, respectively, are positioned about the rotor 12. The windings are typically supported by the retaining ring 40 with its associated locking key 42. Suitable blocking shown generally and schematically as 28 may be positioned between adjacent winding coils. Suitable electrical connections may be made to the field coil winding 18 from an exciter (not shown) which is described in more detail in copending patent application Ser. No. 07/453,309 of the same inventors as the present invention, and assigned to the same assignee as the present invention. The poles of adjacent field windings may be connected by field connectors shown schematically as 54.

The rotor 12 rotates about an axis of rotation shown generally as 46 such that the inertial forces such as centrifugal forces tend to thrust the rotor field coils outwardly against the amortisseurs 30, 32 and 34 and the retaining ring 40. The inertia forces which result from frequent starting and stopping of the generator tend to produce relative motion between windings in a direction which is principally radially outward and perpendicular to the axis of rotation, including however circumferential forces and movement.

Figure 1:
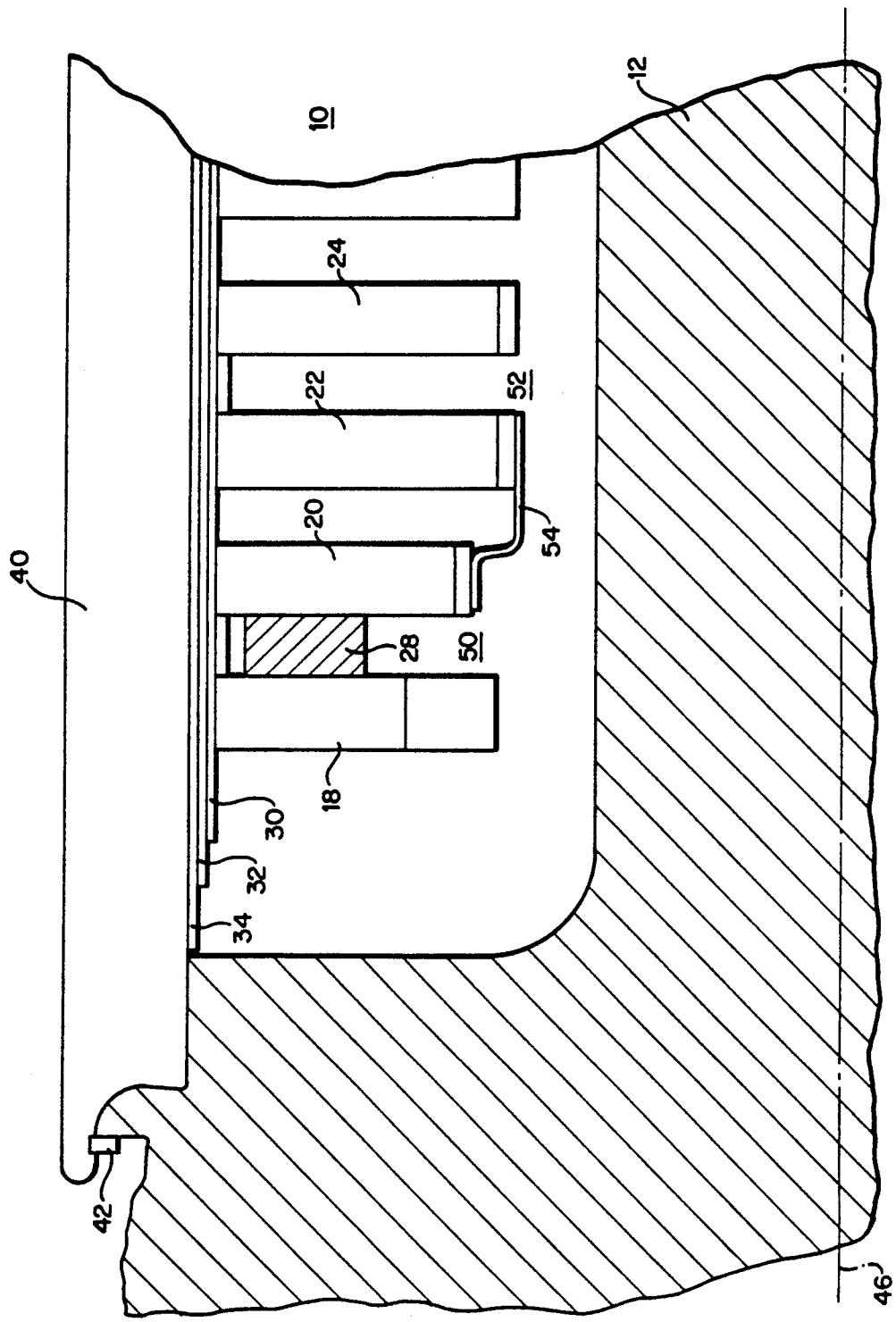
FIG. 1 is a simplified cross-sectional view of a portion of a generator incorporating the present invention.
Figure 2:
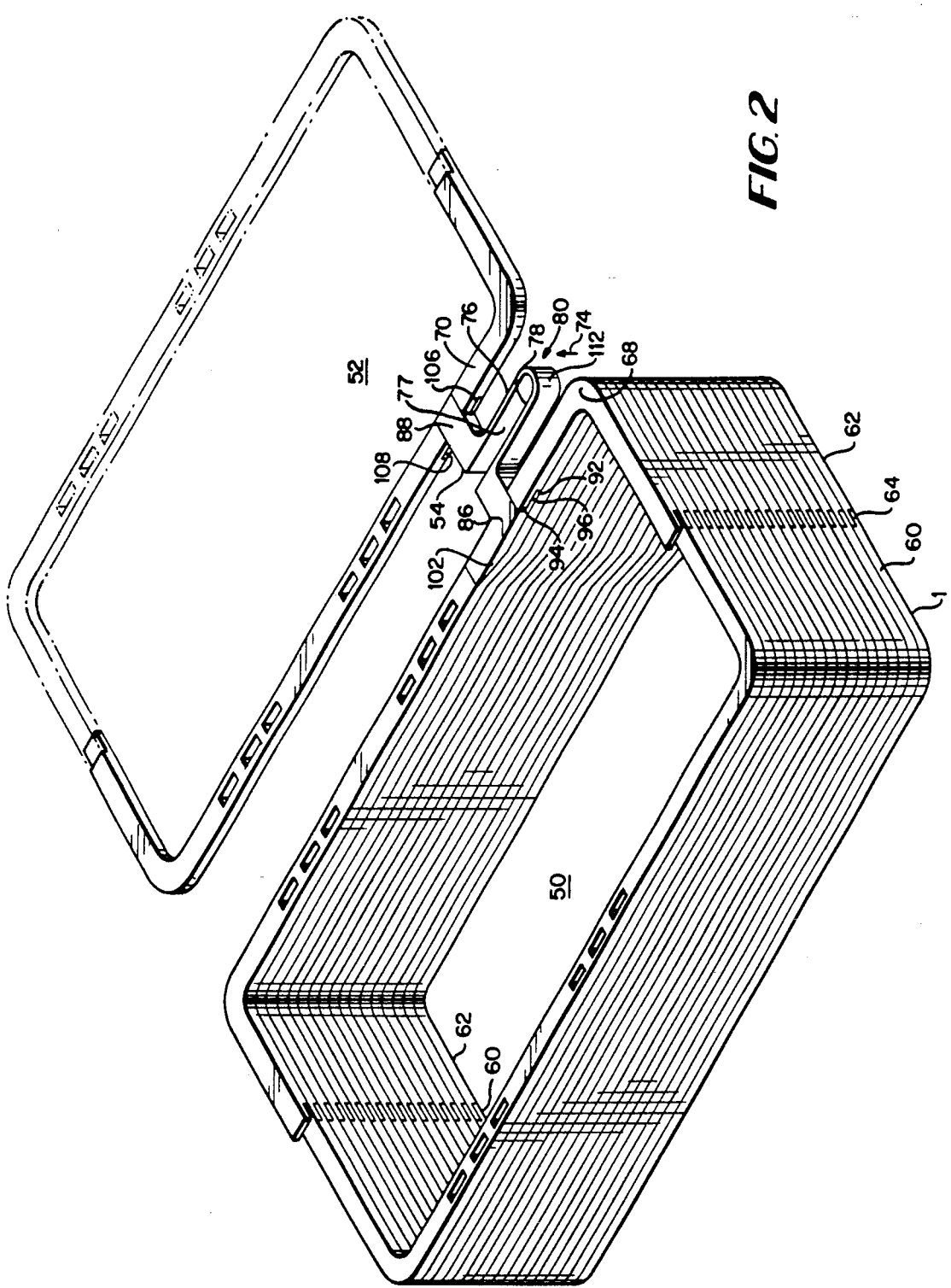
FIG. 2 shows the pre-assembly of field coils utilized in FIG. 1.

FIG. 2 is a perspective view showing the general construction and interconnection of a pair of adjacent coils prior to positioning on, and assembly to, the rotor 12. Coils 50 and 52 are interconnected at their top layers by the pole to pole field connector 54, hereinafter referred to, simply, as the field connector 54. As shown by coil 50, the coils are formed by a plurality of overlapping segmented layers. Each layer of the 20 layer coil shown consists of a pair of generally U-shaped members formed of copper and terminating in overlapping joints. Layer number 1 (identified as 60) is electrically connected to layer number 2 (identified as 62) at the lap joint 64. The coil 50 shown in FIG. 2 consists of 20 insulated layers formed by some 40 segments and connected at diametrically opposed lap joints to build up the coil. The field connector 54 connects the twentieth layers 68 and 70, of the coils 50 and 52, respectively.

The arrow 74 shows the direction of application of centrifugal forces through the pole to pole connector 54 when the pre-assembly shown in FIG. 2 is assembled within the generator or motor 10 and rotor 12 is subjected to starting and stopping cycles. It is to be noted that this force is generally parallel to the jaws 76 and 78 which extend lengthwise to an axis of rotation and which form the central region 80 around apex 112 of the field connector 54. That is, the curved surface of the central region 80 and the opening or slot 77 between jaws 76 and 78 extend generally radially rather than axially, such that the centrifugal force in the direction of arrow 74 does not tend to compress or move the jaws 76 and 78 of the field connector 54 toward or away from one another, as is conventional wisdom and accepted theory in present pole to pole connectors.

The field connector 54 includes at the open end of the generally U-shaped connector a first connector pad 86 which extends from jaw 78 and mates with, and is electrically connected to, coil 50; and a second connector pad 88 which extends from jaw 76 and is configured for electrical connection to the twentieth layer 70 of the coil 52.

The first connector pad 86 includes an extension or lower step 92 which mates with the complementary stepped extension 94 of the twentieth layer 68 of coil 50 to form the lap joint 96. The downwardly tapered end portion 102 of the first connector pad 86, which extends opposite to stepped extension 94, provides a generally level or smooth surface to the top of coil 50 which has an upward rise at that region because of the 20th layer of field coil 50 overlying the 19th layer of the field coil 50, which in turn overlies the layers and similar rises beneath it.

The second connector pad 88 which extends perpendicular to the jaw 76 of the field connector 54 at the open end remote from apex 112 includes a pair of lower extensions or steps 106 and 108 which form lap joints with adjacent segments of the twentieth layer 70 of coil 52.

Figure 3:
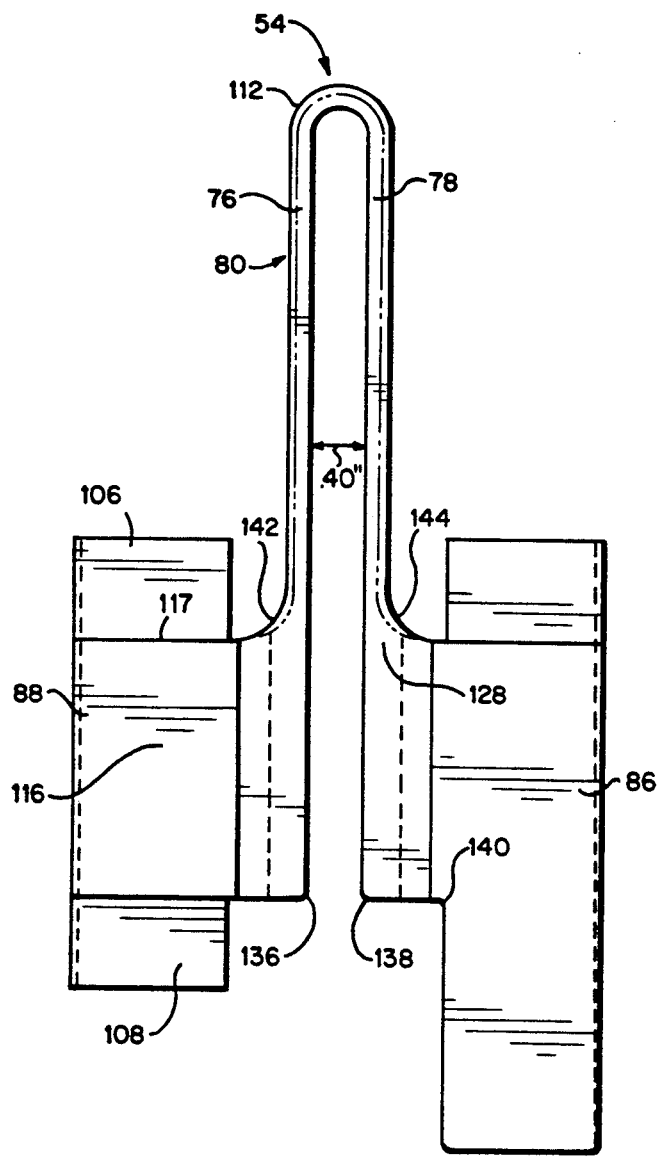
FIG. 3 is an enlarged view of a field to field connector shown in FIG. 2.
Figure 5:
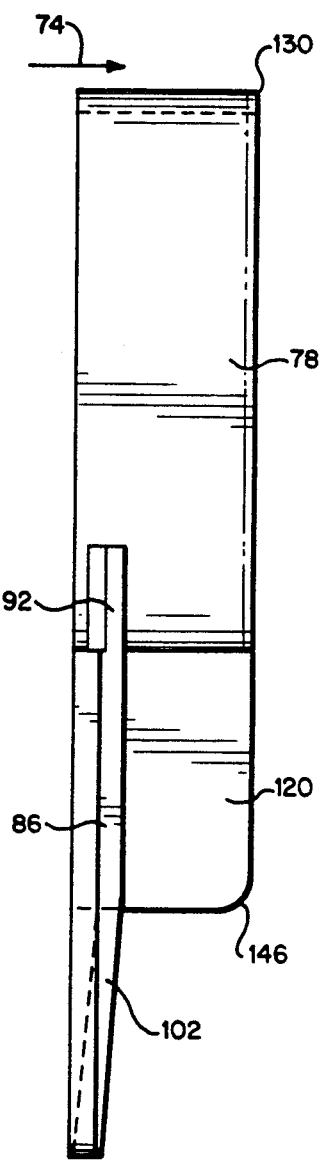
FIG. 5 is a side view of FIG. 3.
Figure 4:
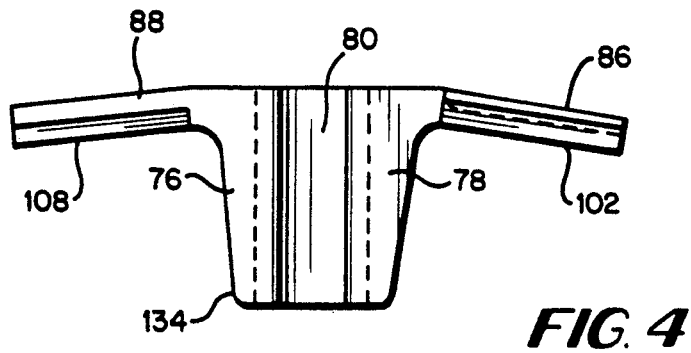
FIG. 4 is an end view of FIG. 3.
Figure 6:
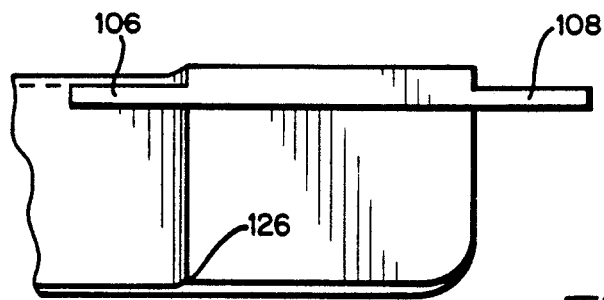
FIG. 6 is a partial left side view of FIG. 4.

The details of the field connector 54 are shown in FIGS. 3 through 7. Referring to FIGS. 3-7, and initially principally to FIG. 3, the field connector 54 includes a hairpin or generally U-shaped central region 80 which, as shown in FIG. 4, tapers downwardly on each side at an angle of 6 4/7 degrees sloping from a width of 1.2 inches at the upper end of the taper to 0.90 inches at the lower end. The jaws 76 and 78 of the central region 80 of field connector 54 are separated by 0.40 inches and are each 0.12 inches thick and 1.25 inches wide. Thus, the centrifugal forces such as shown by arrow 74 in FIGS. 2 and 5 is principally parallel to the jaws 76 and 78 rather than across or perpendicular to the jaws in accordance with conventional wisdom and accepted theory for such connectors. The internal radius of the circular apex 112 of the central region 80 of the field connector 54 is 0.20 inches. The length of the central portion 116 of the second connector pad 88 is 1.75 inches by 1.12 inches while the lower extensions 106 and 108 as shown in FIG. 3 are 0.70 by 1.07 inches, with a depth or step thickness of 0.096 inches. The thickness of the central portion 116 of the second connector pad 88 is 0.194 inches.

Figure 7:
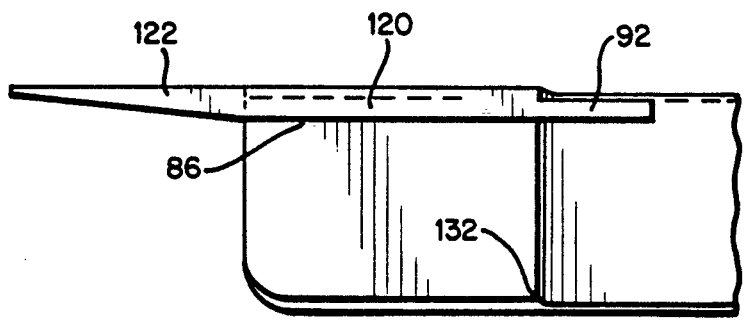
FIG. 7 is a partial right side view of FIG. 4.

As best shown in FIG. 7, the first connecting pad 86 of field connector 54 includes the extension 92 which is 1.12 by 0.70 inches, and which includes a central portion 120 measuring approximately 1.12 by 1.75 inches and which is 0.194 inches thick; and also includes a tapered portion 122 extending 1.37 inches toward an intersection point 0.38 inches further. The distance (best shown in FIG. 3) from the upper end 117 of the central portion 116 of second connector pad 88 to the center of the circular apex 112 of the central region 80 of the field connector 54 is 3.50 inches. As shown in FIG. 4, the first connector pad 86 and the second connector pad 88 extend angularly downward, through an angle of 6 4/7 degrees, as they extend outward form the central region of the pole to pole connector 54 away from the jaws 76 and 78, respectively.

It is to be noted that substantially all of the corners which are not part of lap joints are rounded to avoid sharp intersections to reduce stress and stress points. Rounded corners 126, 128, 130 and 132 are each at an internal radius of 0.03 inches; rounded corners 134, 136, 138 and 140 each have an internal radius of 0.06 inches; rounded corners 142 and 144 each have an internal radius of 0.38 inches; and rounded corner 146 has an internal radius of 0.25 inches.

Conventional wisdom and accepted theory would dictate a multi-leaved curved connector with the centrifugal forces developed by the rotor during the duty stop/start cycles applied perpendicular to the U-shaped curve tending to move the jaws relative to each other to absorb the forces for reliability and maximum start/stop cycles. However, our analysis and related testing of connectors indicates that contrary to that previous thinking and belief, the present invention in which the inertial centrifugal force is principally provided parallel to the jaws of the U-shaped central region will provide improved and unexpected performance and reliability.

The field coil connector 54 is preferably of integral construction and may be machined from high conductivity oxygen free copper. The length of the central region 80 may be varied to accommodate displacement or circumferential forces or movement such that lengthening the central region will accommodate increased circumferential displacements. A generator or motor may include a plurality of field connectors 54 to interconnect the poles of adjacent field coils. Although the present invention has been described as applied to a generator, it is equally applicable to large motors. Also, the dimensions set forth above will vary depending on the geometry of the rotor field coils.

The present invention thus includes a unitary optimized connector geometry which provides flexure and support for its own weight with extremely little or no fatigue, provides adequate current carrying capacity, eliminates or minimizes stress concentrations, especially at the braze joints, and which provides a very high start/stop cyclic duty capability.

Thus, while the present invention has been described with respect to certain preferred embodiments thereof, it is to be understood that numerous variations in the details of construction, the arrangement and combination of parts, and the type of material used may be made without departing from the spirit and scope of the invention.

What we claim is:

1. In an electric machine subjected to multiple starts and stops and including field coils secured to a rotor of the machine which are subjected to forces including centrifugal force on start/stop cycles of the machine, a high reliability field coil connector for interconnecting adjacent field coils comprising:

a first connecting member and a second connecting member joined by an intermediate member;

said intermediate member having a generally U-shaped configuration, and including a first jaw and a second jaw substantially parallel to said first jaw about an opening therebetween and meeting at an apex at one end of said opening and defining an open end at an other end of said opening, said first and second jaws having length, width and thickness dimensions;

said first connecting member and said second connecting member each extending substantially perpendicularly from said open end of said first and second jaws;

said first connecting member being adapted for electrical connection to a first field coil; and said second connecting member being adapted for electrical connection to a second field coil;

said electrical connections of said first and second connecting members orienting said field coil connector such that said first and second jaws extend lengthwise in a direction substantially parallel to an axis of rotation of the rotor such that inertial forces of starting and stopping said electric machine are principally applied parallel to said width dimensions of said jaws and said opening and perpendicular to said first and second connecting members.

2. A high reliability field coil connector of claim 1 wherein said first connecting member includes a first contact portion, and said second connecting member includes a second contact portion for connection to said first and second field coils, respectively.

3. A high reliability field coil connector of claim 2 wherein said first and second contact portions form mating joints with outer layers of said first and second field coils, respectively.

4. A high reliability field coil connector of claim 2 wherein said first connecting member includes a first central portion extending substantially perpendicular from the open end of said first jaw, said first contact portion being substantially perpendicular to said first central portion and substantially parallel to said first jaw.

5. A high reliability field coil connector of claim 4 wherein said second connecting member includes a second central portion extending substantially perpendicular from the open end of said second jaw, and said second contact portion being substantially perpendicular to said second central portion and substantially parallel to said second jaw.

6. A high reliability field coil connector of claim 5 wherein said second contact portion comprises a first extension and a second extension on either side of said second central portion thereof, said first and second extensions each having one surface substantially flush with said second central portion and an opposite surface substantially parallel to said one surface but offset from said second central portion, thereby forming a step between each of said first and second extensions an said second central portion.

7. A high reliability field coil connector of claim 6 wherein said steps on said second contact portion are dimensioned to form a lap joint with mating stepped end portions of an outer layer of said second field coil.

8. A high reliability field coil connector of claim 7 wherein said steps and said mating stepped end portions of the outer layer of said second field coil being dimensioned such that the top of said lap joints are substantially flush with the outer layer of said second field coil.

9. A high reliability field coil connector of claim 4 wherein said first connecting member includes a third extension and a fourth extension extending substantially perpendicular to said first central portion and substantially parallel to said first jaw and configured to mate with an outer layer of said first field coil.

10. A high reliability field coil connector of claim 9 wherein at least one of said third and fourth extensions comprises a step with one surface thereof being substantially flush with one surface of said first central portion and mating with the outer layer of said first field coil in a lap joint.

11. A high reliability field coil connector of claim 10 wherein said first field coil is formed of layers which overlie one another forming a rise where one layer passes over the previous layer, and wherein one of said third and fourth extensions of said first connecting member is tapered to conform to said rise to provide a substantially flush surface for said first field coil in the region of said rise.

12. A high reliability field coil connector of claim 11 wherein said second connecting member includes a second central portion extending substantially perpendicular from said second jaw, and said second contact portion being substantially perpendicular to said second central portion and substantially parallel to said second jaw.

13. A high reliability field coil connector of claim 12 wherein said second contact portion comprises a first extension and a second extension on either side of said second central portion thereof, said first and second extensions each having one surface substantially flush with said second central portion and an opposite surface substantially parallel to said one surface but offset from said second central portion, thereby forming a step between each of said first and second extensions and said second central portion.

14. A high reliability field coil connector of claim 13 wherein said steps on said second contact portion are dimensioned to form a lap joint with mating stepped end portions of the outer layer of said second field coil.

15. A high reliability field coil connector of claim 14 wherein said steps and said mating stepped end portions of the outer layer of said second field coil being dimensioned such that the top of said lap joints are substantially flush with the outer layer of said second field coil.

16. A high reliability field coil connector of claim 1 wherein said first and second connecting members are integral with said intermediate member.

17. A high reliability field coil connector of claim 1 wherein said field coil connector is high conductivity copper.

18. In a rotatable electric machine subjected to multiple stops and starts and which includes a plurality of field coils which are interconnected on a rotor of the rotatable electric machine and which are subjected to inertial forces, including centrifugal forces acting to move the field coils relative to each other, a high reliability field coil connector for interconnecting adjacent field coils comprising:

an intermediate U-shaped member with a first and second connecting pad at a first open end thereof;
said intermediate U-shaped member including a first jaw and a second jaw interconnected about an apex at a second end thereof, to thereby define a slot extending lengthwise from said apex to said first open end, said slot having a width defined by a distance between said first and second jaws;
said first connecting pad extending angularly outwardly from said first jaw and adapted for connection to a first field coil; and
said second connecting pad extending angularly outwardly from said second jaw and adapted for connection to said second field coil;
said connecting pads orienting said field coil connector such that inertial forces of starting and stopping said rotatable electric machine are principally applied to said field coil connector in the direction which is substantially parallel to the width of said slot.

19. A high reliability field coil connector of claim 18 wherein said U-shaped member has a length from said first and second connecting pads to said apex of about 8 times a distance across said slot between said first and second jaws.

20. A high reliability field coil connector of claim 18 wherein substantially all edges of said intermediate U-shaped member are rounded.

21. A high reliability field coil connector of claim 18 wherein said first connecting pad extends outward from said first jaw away from said second jaw and includes a first contact portion substantially parallel to said first jaw.

22. A high reliability field coil connector of claim 21 wherein said second connecting pad extends outward from said second jaw away from said first jaw and includes a second contact portion substantially parallel to said second jaw.

23. A high reliability field coil connector of claim 22 where said first and second contact portions include at least one step portion configured to mate in a lap joint with a layer of a first field coil and a second field coil, respectively, which field coils are to be connected by said field coil connector.

24. A high reliability field coil connector of claim 23 wherein the connections to be made at said first and second field coils by said field connector are at first and second poles of said first and second field coils, respectively.

25. A high reliability field coil connector of claim 24 wherein said second contact portion includes a first step and a second step to interconnect a layer of said second field coil through two lap joints.

26. A high reliability field coil connector of claim 25 wherein said first contact portion includes a first step and a tapered portion to connect to an end of a layer of said first field coil and said tapered portion is configured to overlie a rise where said layer of said first field coil overlies another layer of said first field coil beneath said layer.

27. A high reliability field coil connector of claim 26 wherein said steps of said first and second contact portions and said tapered portion of said first contact portion provide contact and a flush surface to the layers of the first and second field coils to which they are connected.

28. A high reliability field coil connector of claim 27 wherein said first and second contact portions are brazed to poles of said first and second field coils respectively.

29. A high reliability field coil connector of claim 28 wherein the width of each of said first and second contact portions is less than the distance therebetween.

30. A high reliability field coil connector of claim 29 wherein the width of each of said first and second contact portions is in the order of ¾ the distance therebetween.

31. A high reliability field coil connector of claim 18 wherein said first and second connecting pads are integral with said U-shaped member.

32. A high reliability field coil connector of claim 18 wherein said field coil connector is high conductivity copper.

33. A connector for connecting first and second adjacent field coils attached to a rotor of an electric machine, the connector comprising:
- a substantially U-shaped member including parallel first and second jaw members extending lengthwise from a closed apex to an open end, said jaws members each having length, width and thickness dimensions, the width dimension substantially greater than the thickness dimension;
- a first pad connector extending away from said first jaw member at said open end of said U-shaped member and along one edge of said first jaw member;
- a second pad connector extending away from said second jaw member at said open end of said U-shaped member and along a corresponding edge of said second jaw member;
- a first contact portion connected to said first contact pad and extending substantially parallel to said first jaw member; and
- a second contact portion connected to said second contact pad and extending substantially parallel to said second jaw member.

34. The connector of claim 33 wherein said first and second contact portions form mating joints with outer layers of said first and second adjacent field coils, respectively.

35. The connector of claim 33 wherein said first and second contact portions include at least one step portion configured to mate in a lap joint with a layer of a first field coil and a second field coil, respectively.

36. The connector of claim 35 wherein connections to be made at said first and second adjacent field coils by said connector are at first and second poles of said first and second adjacent field coils, respectively.

37. The connector of claim 33 wherein said second contact potion includes a first step and a second step to interconnect a layer of said second field coil through two lap joints.

38. The connector of claim 37 wherein said first contact portion includes a first step and a tapered portion to connect to an end of a layer of said first field coil and said tapered portion is configured to overlie a rise where said layer of said first field coil overlies another layer of said first field coil beneath said layer.

39. The connector of claim 38 wherein said steps of said first and second contact portions and said tapered portion of said first contact portion provide contact and a flush surface to the layers of the first and second adjacent field coils to which they are connected.

40. The connector of claim 33 wherein said connector is high conductivity copper.

41. The connector of claim 33 wherein said first and second pad connectors extend substantially perpendicularly from the length dimension of said first and second jaw members.

42. The connector of claim 41 wherein said first and second pad connectors are inclined relative to the width dimension of said first and second jaw members.

43. The connector of claim 33 wherein said first and second jaw members lies in substantially parallel planes, and said first and second connector pads lie in planes inclined relative to said substantially parallel planes.

* * * * *